US011102082B1

(12) United States Patent
Sarel et al.

(10) Patent No.: US 11,102,082 B1
(45) Date of Patent: Aug. 24, 2021

(54) SYSTEM AND METHOD FOR INFERRING OPERATING SYSTEMS USING TRANSMISSION CONTROL PROTOCOL FINGERPRINTS

(71) Applicant: Armis Security Ltd., Tel Aviv-Jaffa (IL)

(72) Inventors: Yuval Sarel, Tel Aviv (IL); Ben Seri, Tel Aviv (IL); Gil Ben Zvi, Hod Hasharon (IL); Tom Hanetz, Tel Aviv (IL); Yuval Friedlander, Petah-Tiqwa (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 0 days.

(21) Appl. No.: 16/927,299

(22) Filed: Jul. 13, 2020

(51) Int. Cl.
| | |
|---|---|
| *H04L 29/06* | (2006.01) |
| *H04L 12/24* | (2006.01) |
| *G06N 7/00* | (2006.01) |
| *H04L 29/08* | (2006.01) |
| *G06N 20/20* | (2019.01) |
| *G06N 5/04* | (2006.01) |
| *G06K 9/62* | (2006.01) |

(52) U.S. Cl.
CPC .......... *H04L 41/142* (2013.01); *G06K 9/6256* (2013.01); *G06N 5/04* (2013.01); *G06N 7/005* (2013.01); *G06N 20/20* (2019.01); *H04L 67/303* (2013.01)

(58) Field of Classification Search
CPC ... H04L 29/08072; H04L 29/06; H04L 43/00; H04L 12/2602; H04L 41/22; H04L 41/142; H04L 67/303; G06N 20/20; G06N 5/04; G06K 9/6556
See application file for complete search history.

(56) References Cited

U.S. PATENT DOCUMENTS

| | | | |
|---|---|---|---|
| 2004/0123091 A1* | 6/2004 | Das | H04L 67/303 713/2 |
| 2016/0232358 A1* | 8/2016 | Grieco | G06F 21/577 |
| 2018/0260214 A1* | 9/2018 | Oberheide | G06F 9/44505 |
| 2019/0253455 A1* | 8/2019 | Xuan | H04L 63/20 |
| 2019/0260796 A1* | 8/2019 | Hamdi | G06F 7/24 |
| 2020/0177613 A1* | 6/2020 | Nilangekar | H04L 63/20 |

* cited by examiner

*Primary Examiner* — Abdullahi E Salad
(74) *Attorney, Agent, or Firm* — M&B IP Analysts, LLC

(57) ABSTRACT

A system and method for inferring device operating systems. A method includes applying a sequence-based model to an option-types sequence in order to output a plurality of first features, wherein each of the first features is a value representing a probability that the options-type sequence is associated with a respective operating system; applying a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data; and applying an operating system inference model to the plurality of first features and the plurality of second features in order to output an inferred operating system for the device.

19 Claims, 4 Drawing Sheets

US 11,102,082 B1

SYSTEM AND METHOD FOR INFERRING OPERATING SYSTEMS USING TRANSMISSION CONTROL PROTOCOL FINGERPRINTS

TECHNICAL FIELD

The present disclosure relates generally to computing device profiling, and more specifically to inferring operating systems.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to proper risk assessment and to ensuring that appropriate mitigation actions are taken. The challenge involved with profiling a user device is magnified by the fact there is no industry standard for querying and/or obtaining information from user devices, user devices, and so on.

Among information relevant to profiling, the operating system used by a device can be used to identify when the device is acting abnormally as compared to other devices using the same operating system. The operating system used by a device may be relevant for identifying known vulnerabilities that are specific to particular operating systems or operating system versions. To this end, knowledge of the operating system of a device is desirable. However, the operating system may not be explicitly identified in data from the device or may be identified but not in a uniformly recognized format.

It would therefore be advantageous to provide a solution that would aid in accurately determining operating systems used by devices without requiring explicit identification of such.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inferring device operating systems. The method comprises: applying a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device; applying a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and applying an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

Certain embodiments disclosed herein also include a non-transitory computer readable medium having stored thereon causing a processing circuitry to execute a process, the process comprising: applying a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device; applying a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and applying an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

Certain embodiments disclosed herein also include a system for inferring device operating systems. The system comprises: a processing circuitry; and a memory, the memory containing instructions that, when executed by the processing circuitry, configure the system to: apply a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device; apply a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and apply an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
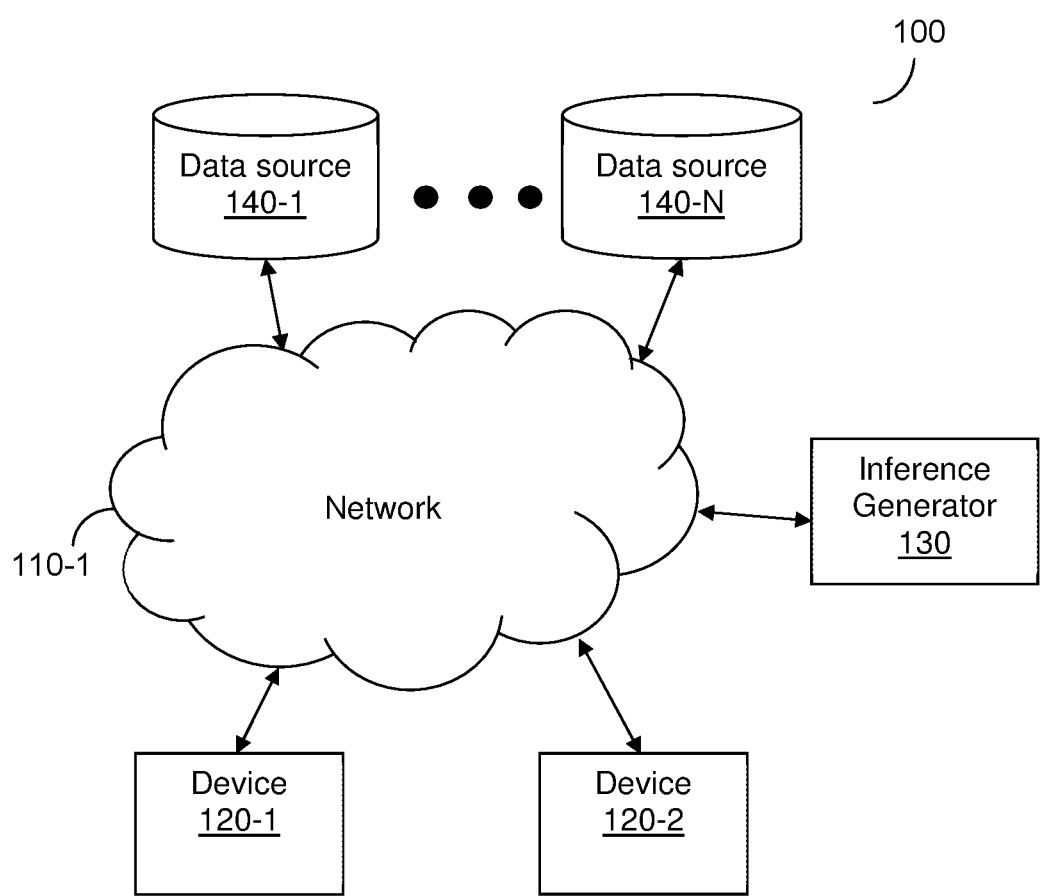
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Data required for cybersecurity purposes may not be explicitly included in incoming data streams. In particular, it has been identified that operating system data, which is useful for predicting normal device activity, is often not included. This may occur, for example, when there is partial coverage of network data or partial coverage due to sampled traffic data. Further, it has been identified that reliance on rules-based mechanisms, which some existing solutions utilize to determine operating systems, yields only somewhat reliable results and may not cover all operating systems. Additionally, rules used by such mechanisms are specific to particular operating systems and therefore require manual definition, tuning, and maintenance, as operating systems are updated or new types of operating systems are introduced. Such manual definition, tuning, and maintenance are cumbersome and cannot be effectively scaled.

In this regard, it has been identified that operating systems follow patterns in activity during network communications that are reflected in a unique "fingerprint" in TCP options sequences and distributions of TCP metadata fields. More specifically, it has been identified that the order in which transmission control protocol (TCP) options are sent and the distribution of certain TCP metadata fields are statistically significant among different instances of the same operating system and, therefore, can be utilized to infer operating systems. This data can be collected during TCP fingerprinting in order to allow for making this inference.

The various disclosed embodiments include a method and system for inferring operating systems of devices based on TCP fingerprinting data. The disclosed embodiments utilize machine learning to infer operating systems based on data transferred during TCP sessions. More specifically, the disclosed embodiments utilize the discovery that the above-noted order of TCP options and distribution of TCP metadata fields are statistically significant among different instances of operating systems in order to accurately infer operating systems based on TCP compliant communications. The disclosed embodiments further utilize multi-stage modeling in order to provide more accurate inferences of operating systems than solutions which utilize explicitly programmed rules for one or both of the stages.

In an embodiment, a sequence-based model and a distribution dissimilarity model are trained for each of one or more operating systems. The sequence-based model is trained to identify unique patterns of TCP options sequences that are statistically significant indicators for different operating systems. Each unique pattern of TCP options sequences is an order in which TCP options were sent. Each distribution dissimilarities model is trained to identify dissimilarities of distributions of TCP metadata fields in input data from known distributions of different operating systems.

When a packet is received using TCP, the sequence-based model and the distribution dissimilarity model are applied to respective data extracted from the packet. The output of each model is a respective set of features to be used by an operating system inference model. The features output by the sequence-based model, the features output by the distribution dissimilarity model, and statistical features extracted from the packets are input to the operating system inference model, which yields an inferred operating system of the device which sent the packet. The outputs may further include a corresponding confidence score for the inferred operating system.

FIG. 1 shows an example network diagram 100 utilized to describe the various disclosed embodiments. In particular, FIG. 1 shows an example network configuration used when applying the machine learning models described herein. In the example network diagram 100, two or more devices 120-1 and 120-2 (hereinafter referred to individually as a device 120 and collectively as devices 120, merely for simplicity purposes), an inference generator 130, and a plurality of data sources 140-1 through 140-N (hereinafter referred to individually as a data source 140 and collectively as data sources 140, merely for simplicity purposes) are communicatively connected via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

Each device 120 may be, but is not limited to, a network adaptor, network interface card, smartphone, or other network device having a network interface configured to connect to a network.

The inference generator 130 is configured to infer operating systems based on TCP packets using machine learning models as described herein. To this end, the inference generator 130 may be configured to train the machine learning models using data stored in the data sources 140, to apply the machine learning models to data stored in the data sources 140, or both. The data includes features to be used as training data for training the machine learning models described herein. More specifically, such data includes TCP options, TCP metadata fields, TCP options sequence features, distribution dissimilarity features, statistical features families, or a combination thereof.

In some embodiments, the inference generator 130 is configured to generate a device profile including the inferred operating system or to add the inferred device model to a device profile. In a further embodiment, the inference generator 130 is configured to monitor activity of the device 120 in order to mitigate any potentially malicious behavior by the device 120, to mitigate any potential vulnerabilities of the device 120, or both. Such potentially malicious behavior or potential vulnerabilities may be detected based on the device profile and behavior of the device, device configuration, or both. Alternatively, the inference generator 130 may send the inferred device model or the device profile including the inferred device model to an optional cybersecurity tool 150.

It should be noted that the network diagram shown in FIG. 1 is merely illustrative and that the disclosed embodiments do not require the particular network setup shown therein. As a particular example, the training using data stored in the data sources 140 may be performed offline, and the inference generator 130 may not be connected to the data sources 140 via the network 110 or may not be communicatively connected to the data sources 140 via the network 110 at the same time as it is communicatively connected to one of the devices 120. Further, the inference generator 130 may be communicatively connected to one of the devices 120 but not the other.

Figure 2:
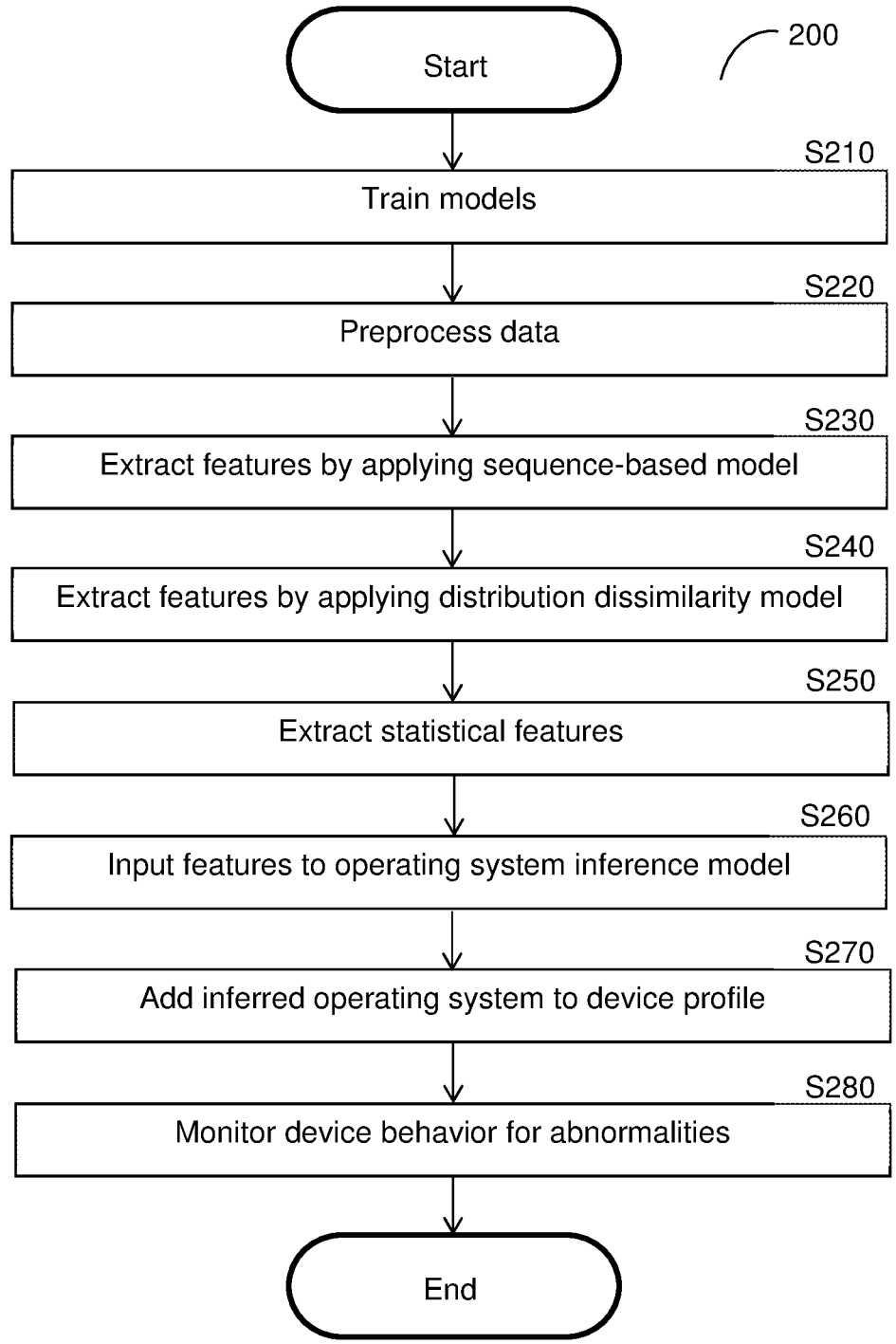
FIG. 2 is a flowchart illustrating a method for inferring operating systems based on Transmission Control Protocol options according to an embodiment.

FIG. 2 is a flowchart 200 illustrating a method for inferring device models based on MAC addresses according to an embodiment.

At S210, sequence-based models, distribution dissimilarity models, and an operating system inference model are trained using features included in training data (e.g., data stored in one or more of the data sources 140, FIG. 1). Each sequence-based model and each distribution dissimilarity model is trained based on training data for a different operating system such that each sequence-based model and each distribution dissimilarity model is trained to identify sequences or distributions of its respective operating system.

Each sequence-based model is trained to accept a TCP option-types sequence as an input and to output values representing respective probabilities that the TCP option-types sequence is indicative of a particular operating system. One probability is output per potential operating system. The TCP-option-types sequence includes an ordered list of TCP option types as represented by option headers. In an example implementation, the sequence based model is trained using a Markov model for each type of operating system which could be identified.

Each distribution dissimilarity model is trained to identify unique distributions of a respective TCP metadata field parameter and is configured to output vectors indicating a distance between the distribution of each input TCP metadata field parameter from respective known distributions of respective operating systems. To this end, each distribution dissimilarity model is configured to determine a number of occurrences of each value in the distribution of each metadata field parameter across different known operating systems. As a non-limiting example, one of the metadata field parameters is window scale which has 7 values among its distribution. The distance is therefore determined based on a number of occurrences of each of the 7 values among distributions of known operating systems. Thus, each vector indicates the degree to which the input distribution is dissimilar to the known distribution for each operating system.

The operating system inference model is configured to output an inferred operating system and a corresponding confidence score based on statistical features, outputs of the sequence-based model, and outputs of the distribution dissimilarity model. Accordingly, the disclosed embodiments provide a multi-stage machine learning approach. In an example implementation, the operating system inference model may be trained using a boosting algorithm such as, but not limited to, an XGBoost model. Such a boosting algorithm is an ensemble meta-model from a Gradient Boosting models family over all of the respective input features of the operating system inference model.

In this regard, it is noted that, although other models may be equally utilized without departing from the scope of the disclosure, ensemble and boosting models are more robust than some other types of models and may be less prone to overfitting. Additionally, tree-based boosting models do not require any kind of features normalization since they function using Decision Trees.

In this regard, it has been identified that existing solutions for determining operating systems rely on predetermined rules which may not account for new variations as operating systems evolve. In particular, patterns of TCP options and distributions of TCP metadata fields may change over time. It has been identified that reliance on predetermined patterns and distributions would result in less accurate operating system inferences. Thus, the disclosed embodiments utilize machine learning to extract features used by the operating system inference model, thereby improving the accuracy of that model.

At optional S220, data to be used when applying the trained machine learning models is preprocessed. S220 may include, but is not limited to, cleaning the data, normalizing the data, or both.

At S230, the sequence-based model is applied to the TCP header fields in order to output a set of sequence-based features. The set of sequence-based features includes values representing the likelihood that an ordered list of TCP option types is indicative of respective operating systems.

At S240, the distribution dissimilarity model is applied to the TCP metadata fields in order to output a set of distribution dissimilarity features. The set of distribution dissimilarity features includes vectors indicating distances between the metadata field distributions of a given device and known distributions of respective operating systems.

At S250, statistical features to be utilized by the operating system inference model are extracted from the packets. In particular, extracting the statistical features to be used by the operating system inference model may include calculating statistical aggregations over all instances of each device. In this regard, it has been identified that various statistical features may be suggestive of particular operating systems such that certain values of those features may, individually or in combination, be indicative of a particular operating system. As a non-limiting example, a maximum possible value of MSS may be indicative of a Linux operating system.

The statistical features include basic characteristics of the distributions of each of the fields Window Size, Window Scale, and MSS. The statistical features are calculated per device. Such characteristics include minimum, maximum, mean, mode and median values, and number of unique values. As a non-limiting example, the maximum value of the field Window Scale for a device having a device identifier "ABCDE" as 64620.

At S260, the sequence-based features extracted at S230, the distribution dissimilarity features extracted at S240, and the statistical features extracted at S250 are input to the operating system inference model in order to output an inferred operating system.

Figure 3:
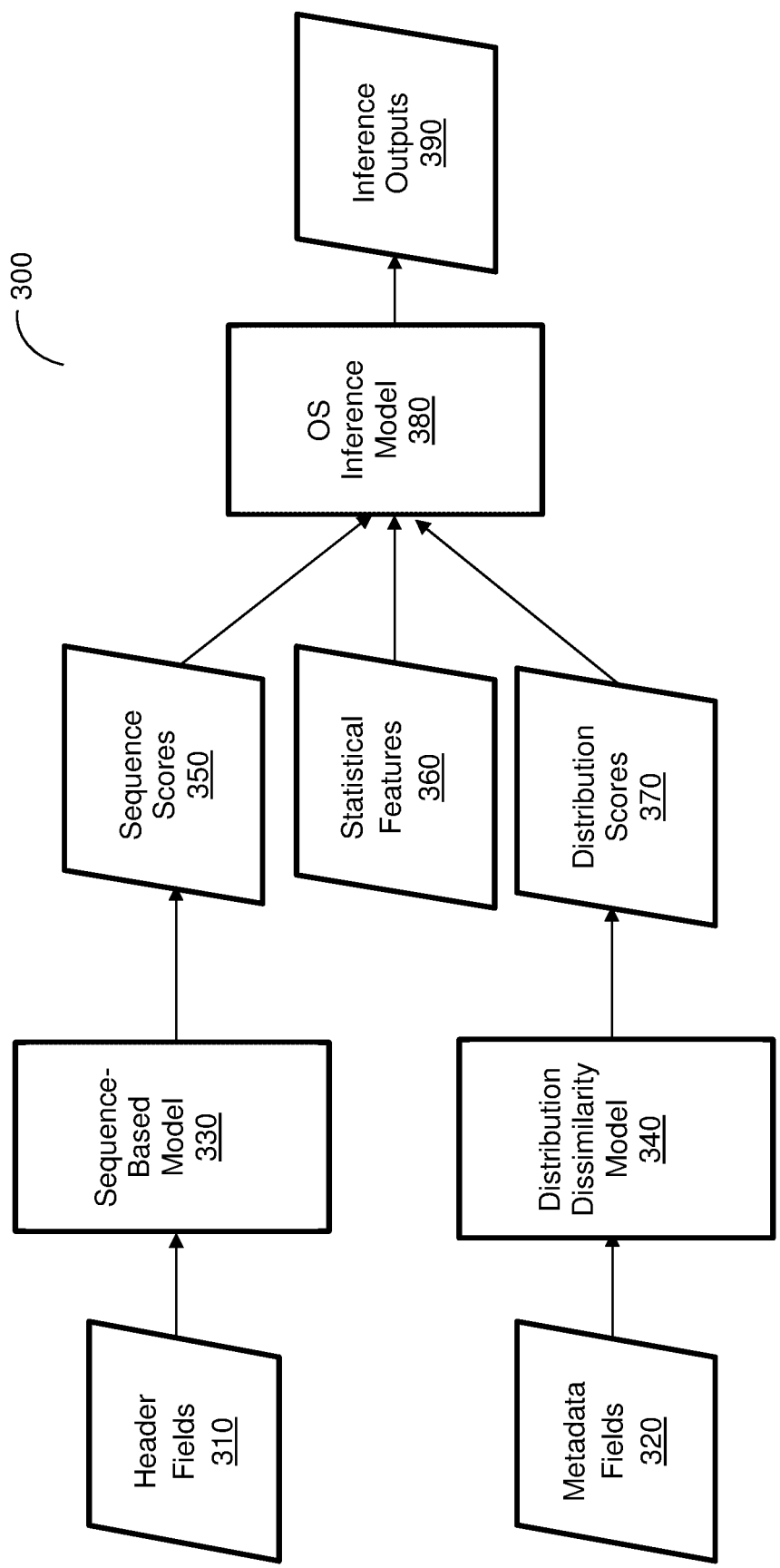
FIG. 3 is a flow diagram illustrating inputs and outputs of the various machine learning models described herein.

The interactions among the machine learning models described herein are visually depicted in a flow diagram 300 shown in FIG. 3. The flow diagram 300 includes header fields 310 and metadata fields 320 being input into a sequence-based model 330 and a distribution dissimilarity model 340, respectively.

The header fields 310 include a TCP option-types sequence. The TCP option-types sequence is an ordered list of types of TCP options received in headers in order. As a non-limiting example, such a TCP option-types sequence is [2, 1, 3, 1, 1, 4]. This sequence therefore represents 6 TCP options, sent in order of appearance. In this example, the numbers represent the following types of TCP option types: 1 represents No Option (Nop), 2 represents Maximum Segment Size (MSS), 3 represents Window Scale, and 4 represents Selective Acknowledgment Permitted. No option (represented by value "1") was sent in multiple TCP headers represented by this sequence. This sequence may, for example, indicate with high probability that the operating system of the system sending the packets with these headers is Windows®.

The metadata fields 320 include, for example, Window Size, Window Scale, and Maximum Segment Size (MSS). Each metadata field 320 has a distribution of values. As a non-limiting example, the metadata field Window Scale may include the distribution {64620:0.2, 29200:0.7, 8192:0.1}. This example illustrates device data in which the value 64620 appears in 20% of the instances, the value 29200 appears in 70% of the instances and the value 8192 appears in 10% of the instances. This distribution is then compared to known distributions of respective operating systems, and a Cross-Entropy determination is performed based on distance value per operating system. The resulting values are the dissimilarity features of the Window Scale field. Likewise, distance values are determined for the Window Size and MSS fields too. This distribution may, for example, indicate that the operating system of the system sending the packets with these headers is Windows®.

The output of the sequence-based model is a set of sequence scores 350. Each of the sequence scores 350 is a value representing a probability that the input TCP options-type sequence is indicative of a respective operating system. The output of the distribution dissimilarity model is a set of distributions scores 370. The distribution scores 370 include subsets of 3 values for each respective operating system. Each value among the distribution scores 370 is a scalar value such that each subset collectively represents a distance (measured by Cross-Entropy) between two distributions of the same input field for a respective operating system.

The sequence scores 350, the distribution scores 370, and statistical features 360 calculated as described above, are input to the operating system (OS) inference model 380. The result is inference outputs 390. The inference outputs 390 include an inferred operating system and a corresponding confidence score.

Returning to FIG. 2, at optional S270, each inferred device operating system is added to a respective device profile.

At optional S280, device activity of one or more of the profiled devices may be monitored and potential cybersecurity threats identified via the monitoring may be mitigated. The monitoring and mitigation may include, but is not limited to, monitoring for abnormal or otherwise malicious behavior, detecting vulnerable devices, both, and the like.

In an example implementation, the device profile may be generated, potential vulnerabilities may be detected, or both, as described further in U.S. Pat. No. 10,511,620, assigned to the common assignee, the contents of which are hereby incorporated by reference.

It should be noted that the steps of FIG. 2 are shown as a single flowchart for simplicity purposes, but that at least some of the steps may be performed at distinct times. As a particular example, the training of models may be performed in advance and the models may be stored for subsequent use when packets are sent. Further, the models trained at S210 may be trained at separate times from each other without departing from the scope of the disclosure.

Additionally, in some embodiments, some steps may be performed by different systems. In particular, the training of models, the profiling of devices and monitoring for abnormalities, or both, may be performed by systems other than the system which determines the inferred operating system without departing from the scope of the disclosure.

Figure 4:
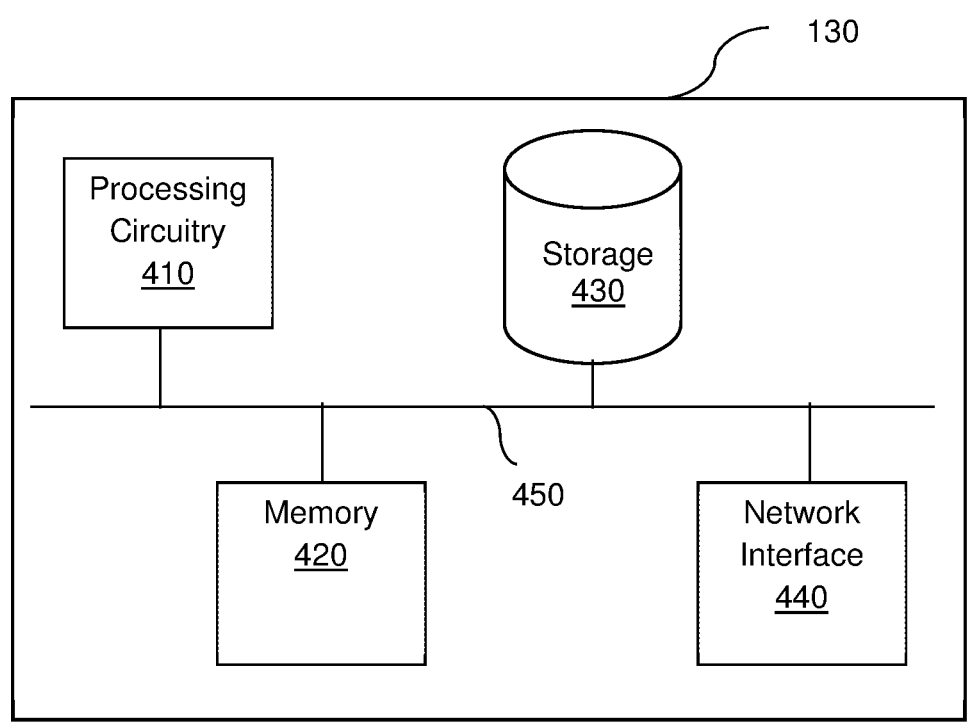
FIG. 4 is a schematic diagram of an inference generator according to an embodiment.

FIG. 4 is an example schematic diagram of an inference generator 130 according to an embodiment. The inference generator 130 includes a processing circuitry 410 coupled to a memory 420, a storage 430, and a network interface 440. In an embodiment, the components of the inference generator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inference generator 130 to communicate with the data sources 140 for the purpose of, for example, retrieving training data. The network interface 440 also allows the inference generator to communicate with one or more of the devices 120 for the purpose of intercepting packets, performing mitigation actions, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inferring device operating systems, comprising:
    applying a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device;
    applying a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and
    applying an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

2. The method of claim 1, applying the aggregated statistical model to the block statistics further comprises:
    extracting a plurality of statistical features from the packets of the headers sent by the device, wherein the operating system inference model is further applied to the extracted statistical features.

3. The method of claim 1, wherein the metadata fields indicated in the metadata field distribution data include at least one of: Window Size, Window Scale, and Maximum Segment Size.

4. The method of claim 3, wherein the metadata fields indicated in the metadata field distribution data include each: Window Size, Window Scale, and Maximum Segment Size.

5. The method of claim 1, wherein the packets sent by the device are formatted according to the transmission control protocol.

6. The method of claim 1, wherein the operating system inference model is further configured to output a confidence score for the inferred operating system.

7. The method of claim 1, wherein the operating system inference model is an ensemble boosting algorithm.

8. The method of claim 1, further comprising:
    adding the inferred operating system to a device profile of the device.

9. The method of claim 8, further comprising:
    monitoring behavior of the device based on the device profile to detect abnormal behavior of the device, wherein the abnormal behavior is a deviation from a predetermined normal behavior associated with the inferred operating system.

10. A non-transitory computer readable medium having stored thereon instructions for causing a processing circuitry to execute a process, the process comprising:

applying a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device;

applying a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and applying an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

11. A system for inferring device models, comprising:
a processing circuitry; and
a memory, the memory containing instructions that, when executed by the processing circuitry, configure the system to:

apply a sequence-based model to an option-types sequence in order to output a plurality of first features, wherein each of the first features is a value representing a probability that the options-type sequence is associated with a respective operating system of a plurality of operating systems, wherein the option-types sequence is an ordered list of options types extracted from headers of packets sent by a device;

apply a distribution dissimilarity model to metadata field distribution data extracted from the headers of the packets sent by the device in order to output a plurality of second features, wherein the plurality of second features includes a plurality of distances, wherein each distance is based on a difference between a distribution of values of each metadata field indicated in the metadata field distribution data and a distribution of a corresponding metadata field of each of the plurality of operating systems; and apply an operating system inference model to the plurality of first features and the plurality of second features in order to output an inferred operating system for the device, wherein the inferred operating system is one of the plurality of operating systems, wherein the operating system inference model is a machine learning model trained based on training option-types sequence features and training metadata field distribution features.

12. The system of claim 11, wherein the system is further configured to:
extract a plurality of statistical features from the packets of the headers sent by the device, wherein the operating system inference model is further applied to the extracted statistical features.

13. The system of claim 11, wherein the metadata fields indicated in the metadata field distribution data include at least one of: Window Size, Window Scale, and Maximum Segment Size.

14. The system of claim 13, wherein the metadata fields indicated in the metadata field distribution data include each: Window Size, Window Scale, and Maximum Segment Size.

15. The system of claim 11, wherein the packets sent by the device are formatted according to the transmission control protocol.

16. The system of claim 11, wherein the operating system inference model is further configured to output a confidence score for the inferred operating system.

17. The system of claim 11, wherein the operating system inference model is an ensemble boosting algorithm.

18. The system of claim 11, wherein the system is further configured to:
add the inferred operating system to a device profile of the device.

19. The system of claim 18, wherein the system is further configured to:
monitor behavior of the device based on the device profile to detect abnormal behavior of the device, wherein the abnormal behavior is a deviation from a predetermined normal behavior associated with the inferred operating system.

* * * * *